(12) United States Patent
Im et al.

(10) Patent No.: US 6,519,392 B2
(45) Date of Patent: Feb. 11, 2003

(54) OPTICAL TAP COLLIMATOR USING AN UNCOATED GRIN LENS

(75) Inventors: Young-Min Im, Kyungki-do (KR); Hwe-Kyung Kim, Cheolrabuk-do (KR)

(73) Assignee: Korea Electronics Technology Institute, Pyeongtaek (KR)

( * ) Notice: Subject to any disclaimer, the term of this patent is extended or adjusted under 35 U.S.C. 154(b) by 0 days.

(21) Appl. No.: 09/760,357

(22) Filed: Jan. 12, 2001

(65) Prior Publication Data

US 2002/0006252 A1 Jan. 17, 2002

(30) Foreign Application Priority Data

Jun. 2, 2000 (KR) .......................... 2000-30433

(51) Int. Cl.[7] .............................. G02B 6/26; G02B 6/42
(52) U.S. Cl. ........................................... 385/48; 385/31
(58) Field of Search ...................... 385/48, 31

(56) References Cited

U.S. PATENT DOCUMENTS 3,829,195 A * 8/1974 Rawson ........................ 385/25
4,213,677 A * 7/1980 Sugimoto et al. ............ 359/131
4,550,975 A * 11/1985 Levinson et al. ............ 359/131
5,299,056 A * 3/1994 Kurata et al. ............... 359/341.1
5,539,577 A * 7/1996 Si et al. ....................... 359/583
5,657,155 A * 8/1997 Cheng ......................... 359/341.1
5,917,626 A * 6/1999 Lee ............................. 359/124
6,084,994 A * 7/2000 Li et al. ....................... 359/131

* cited by examiner

Primary Examiner—Lynn D. Feild
Assistant Examiner—Hae Moon Hyeon
(74) Attorney, Agent, or Firm—Alston & Bird LLP

(57) ABSTRACT

Disclosed is a tap coupler which comprises a ferrule comprising first and second optical fibers symmetrically positioned with respect to an optical axis for transmitting optical signals; and a graded index (GRIN) lens converting a part of the optical signals provided by one of the optical fibers of the ferrule into parallel beams and outputting the same, and reflecting the remaining part of the optical signals and outputting the same to another optical fiber of the ferrule, and having an uncoated beam outputting surface. The tap coupler can easily extract a part of the transmitted optical signals with low production cost and a smaller size.

6 Claims, 4 Drawing Sheets

OPTICAL TAP COLLIMATOR USING AN UNCOATED GRIN LENS

BACKGROUND OF THE INVENTION (a) Field of the Invention

The present invention relates to a tap coupler. More specifically, the present invention relates to a tap coupler for extracting some of the optical signals transmitted from an optical transmission system.

(b) Description of the Related Art

A tap coupler of an optical transmission system extracts some of the optical signals flowing through optical paths and monitors states of the optical paths or the optical signals.

FIG. 1 shows a conventional tap coupler. As shown, the tap coupler comprises a collimator 1 and a beam splitter 2, that is positioned along an optical axis of the collimator 1 for reflecting some of the optical signals output from the collimator 1. One surface of the collimator 1 is coated with an antireflection coating.

In the above-noted tap coupler, the collimator 1 converts the optical signals transmitted via optical fibers into parallel beams and transmits the same to the beam splitter 2, and the beam splitter 2 permits some of the beams to penetrate with the remaining beams to be reflected. At this time, the quantity of beam signals reflected is varied according to a dividing ratio of the beam splitter 2, and the reflected beam signals are used to monitor the states of the optical transmission lines.

However, since the conventional tap coupler needs a beam splitter for extracting the optical signals for monitoring use, manufacturing cost is expensive. Also, since the beam splitter is used as well as the collimator, it is difficult to reduce the size of the tap coupler.

SUMMARY OF THE INVENTION

It is an object of the present invention to provide a tap coupler with smaller size and low manufacturing cost.

In one aspect of the present invention, a tap coupler comprises a ferrule comprising first and second optical fibers symmetrically positioned with respect to an optical axis for transmitting optical signals; and a graded index (GRIN) lens for converting a part of the optical signals provided by one of the optical fibers of the ferrule into parallel beams and outputting the same, and reflecting a part of the optical signals and outputting the same to another optical fiber of the ferrule with the GRIN lens having an uncoated beam outputting surface.

The GRIN lens can be arranged to be inclined to a predetermined angle with respect to the optical axis.

The GRIN lens can be arranged in order for the center of the GRIN lens to be over or below the optical axis.

An antireflection coating film is preferably formed on one surface of the GRIN lens facing the ferrule.

The distance between output ends of the first and second optical fibers and a beam outputting surface of the GRIN lens is preferably P/4, and the P represents one pitch of the optical signal.

The first optical fiber can be a single mode optical fiber and the second optical fiber can be a multi mode optical fiber.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

In general, optical signals that propagate through a substance are reflected at the surface of the substance, and the reflectance is determined according to refractive indices of both substances facing each other at their boundaries.

$$R = \left(\frac{n_1 - n_0}{n_1 + n_0}\right)^2 \quad \text{Equation 1}$$

where $n_1$ is the refractive index of a first medium, $n_0$ is the refractive index of a second medium, and R is the reflectance.

For example, if $n_1$ is 1.5 and $n_0$ of air is 1, it follows according to Equation 1 that, $R=\{(1.5-1)/(1.5+1)\}^2=0.04$. Therefore, about 4% of the optical signals that propagate through the first medium are reflected on the boundary of the first and second media, and the remaining 96% penetrate the boundary and propagate through the second medium.

All lenses have reflection characteristics described above, and the GRIN lens according to the preferred embodiment of the present invention has the subsequent characteristics.

Figure 1:
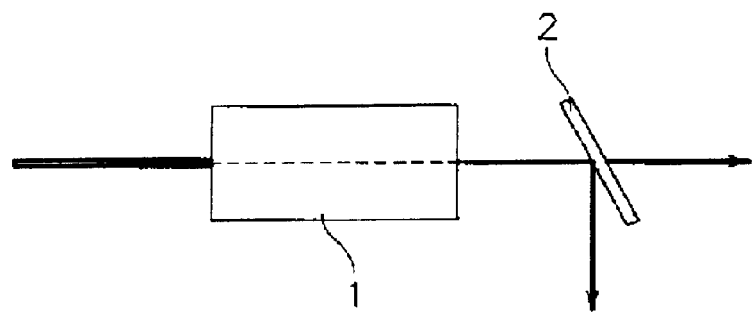
FIG. 1 shows a conventional tap coupler.
Figure 2:
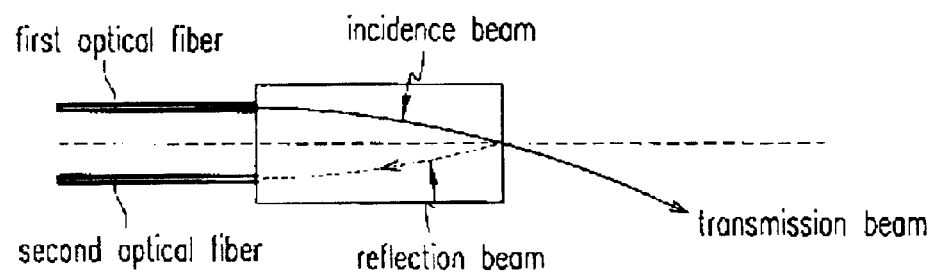
FIG. 2 shows a graded index (GRIN) lens according to a preferred embodiment of the present invention.

FIG. 2 shows the characteristics of the GRIN lens according to the preferred embodiment of the present invention.

As shown, the beams input to the GRIN lens via a first optical fiber proceed along the path in the GRIN lens, and at the boundary of the GRIN lens facing the air, the beams are divided into penetration beams to be provided to the air and reflection beams to be reflected at the boundary and returned within the lens. At this time, the reflection beams proceed along a path symmetric with the incident path with respect to the optical axis according to the GRIN lens characteristics. Hence, when placing a second optical fiber symmetric with the first optical fiber with respect to the optical axis, the reflected optical beams can be extracted using the GRIN lens via the second optical fiber.

In one case, the GRIN lens is made of glass having a refractive index of 1.5 and the distance between an output end of the optical fiber for outputting the optical signals and the beam outputting surface of the GRIN lens is P/4 (P represents one pitch of the optical signal.), 4% of the optical signals input to the GRIN lens are reflected, and the remaining 96% of the optical signals are transmitted as parallel beams.

By using the above-noted characteristics of the GRIN lens that some part of the beams is reflected at the boundary surface facing the other medium and the reflected beams proceed along the path symmetric with the incidence path with respect to the optical axis, a part of the transmitted beams is extracted and a tap coupler for monitoring the states of the optical transmission lines and the optical signals is then implemented.

Figure 3:
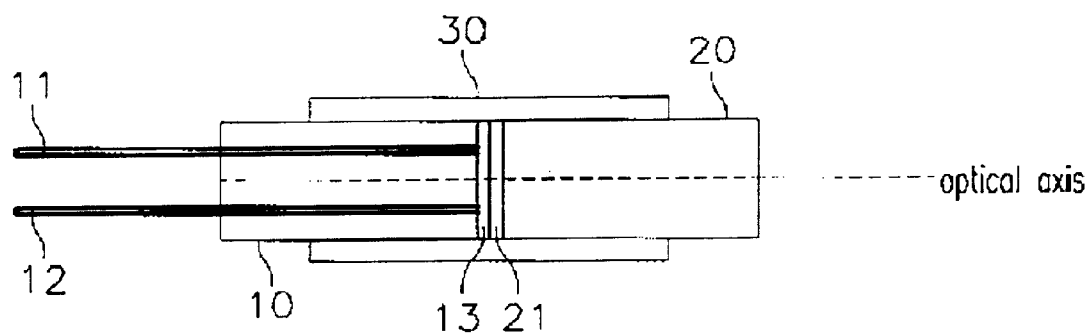
FIG. 3 shows a tap coupler according to a first preferred embodiment of the present invention.

FIG. 3 shows a tap coupler using the above-described principle according to a first preferred embodiment of the present invention.

As shown in FIG. 3, the tap coupler comprises a ferrule 10 having first and second optical fibers 11 and 12 symmetrically installed with an identical gap with respect to the optical axis, and a GRIN lens 20 serially connected to the ferrule 10 on the identical optical axis. A holder 30 supports the ferrule 10 and the GRIN lens 20.

Antireflection coating films 13 and 21 are formed on the beam outputting surface of the ferrule 10, ends of the first and second optical fibers 11 and 12, and one surface of the GRIN lens 20 so as to prevent beam reflections generated when the optical signals transmitted via the first and second optical fibers 11 and 12 are provided to the GRIN lens 20. A distance between the output ends of the first and second optical fibers 11 and 12 and the beam outputting surface of the GRIN lens 20 is P/4.

In the tap coupler of the above-noted configuration, the optical signals transmitted via the first optical fiber 11 are provided to the GRIN lens with no beam reflections because of the antireflection coating film 21. The optical signals provided to the GRIN lens 20 proceed in parallel along the optical axis, and some (4%) of the optical signals are reflected by the beam outputting surface of the GRIN lens 20 and the remaining (96%) optical signals are transmitted. In the case in which the beam outputting surface of the GRIN lens 20 is connected to another GRIN lens and an optical fiber, the optical signals that are output by the GRIN lens 20 are transmitted via the optical fiber.

The optical signals reflected at the beam outputting surface of the GRIN lens 20 are input to the GRIN lens 20 again and provided to the second optical fiber 12. Hence, the states of the optical signals or the optical transmission lines can be monitored by detecting the optical signals transmitted via the second optical fiber 12.

A method for adjusting the quantity of the reflected optical signals is to adjust the quantity of the reflected optical signals input to the optical fiber 12 which substantially adjusts the quantity of the optical signals to be monitored.

A first method is to arrange the optical fiber and the GRIN lens in an inclined manner which adjusts the reflectance.

In detail, when two optical fibers are positioned in parallel with a predetermined gap with respect to the optical axis, and the GRIN lens is arranged to be inclined to a predetermined angle with respect to the optical axis, the position of the optical signals transmitted from the first optical fiber and provided to the GRIN lens is varied, and accordingly some optical signals reflected by the GRIN lens are not provided to the second optical fiber, and therefore the optical signals reflected via the second optical fiber are reduced.

Figure 4A:
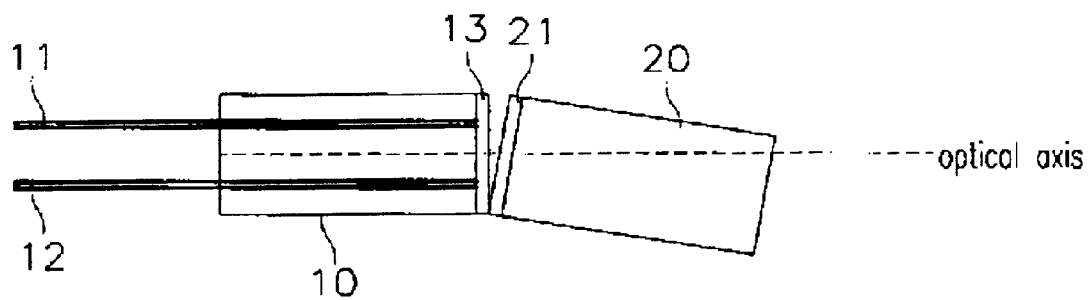
FIGS. 4(a) and (b) show a tap coupler according to a second preferred embodiment of the present invention.

FIGS. 4(a) and (b) show a tap coupler according to a second preferred embodiment of the present invention.

As shown, the tap coupler comprises a ferrule 10 and a GRIN lens 20 identical with the first preferred embodiment, but the GRIN lens 20 is arranged to be inclined to a predetermined angle with respect to the optical axis, different from the first preferred embodiment. Antireflection coating films 13 and 21 are formed on the beam inputting surfaces of the ferrule 10 and the GRIN lens 20 so as to prevent transmission loss.

Figure 4B:
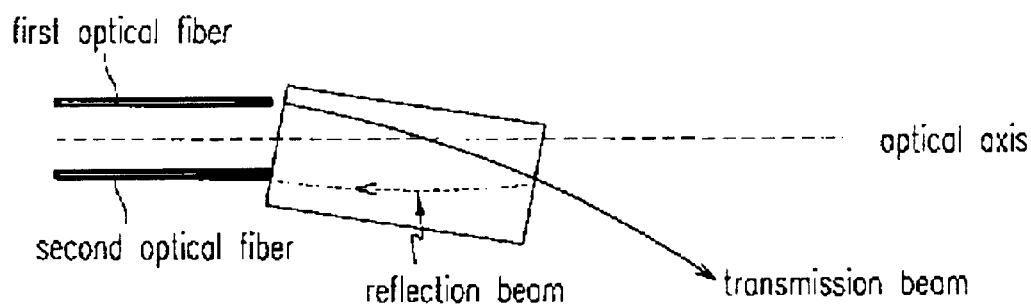

Since the GRIN lens 20 is arranged to be declined to a predetermined angle with respect to the optical axis, as shown in FIG. 4(b), the position of the optical signal transmitted via the first optical fiber 11 and provided to the GRIN lens 20 is varied.

A second method for adjusting the quantity of the detected optical signals to be monitored is to position the center of the GRIN lens to be offset from the optical axis which varies the position of the optical signals transmitted via the optical fiber and provided to the GRIN lens.

Figure 5A:
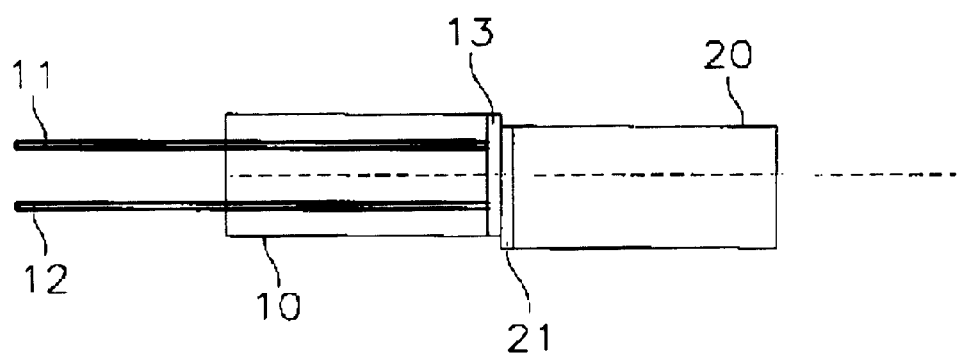
FIGS. 5(a) and (b) show a tap coupler according to a third preferred embodiment of the present invention.

FIGS. 5(a) and (b) show a tap coupler according to a third preferred embodiment of the present invention. As shown in FIG. 5(a), the GRIN lens 20 is arranged in order for the center of the GRIN lens 20 to be below the optical axis.

Figure 5B:
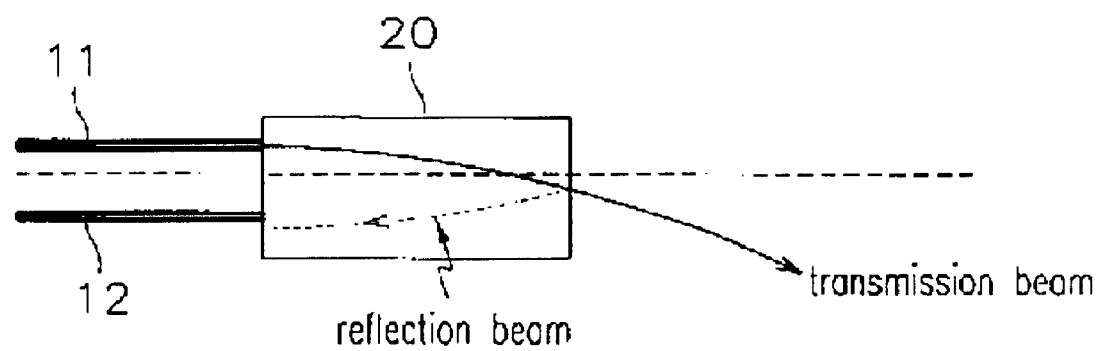

Therefore, as the position at which the optical signals transmitted via the first optical fiber 11 are provided to the GRIN lens 20 is varied, as shown in FIG. 5(b), since some of the optical signals reflected by the GRIN lens 20 are not provided to the second optical fiber 12, the quantity of the optical signals transmitted via the second optical fiber 12 is reduced.

Differing from this, by positioning the GRIN lens 20 in order for the center of the GRIN lens 20 to be over the optical axis, the position at which the optical signals transmitted via the first optical fiber 11 are provided to the GRIN lens 20 can be varied.

As described above, by varying the positions at which the optical signals transmitted from the optical fiber are provided to the GRIN lens, the quantity of the optical signals detected to be monitored can be adjusted.

In a tap coupler of another preferred embodiment that can be applied to all the above-noted preferred embodiments, the first optical fiber 11 is defined to be a single mode fiber and the second optical fiber 12 is defined to be a multi mode fiber, and when the optical signals reflected at the beam outputting surface of the GRIN lens 20 are transmitted to the second optical fiber 12, optical loss can be reduced.

That is, since the core of the single mode optical fiber is 8 to 10 $\mu$m and that of the multi mode optical fiber is 50 to 65 $\mu$m, and accordingly the size of the multi mode fiber is 6 to 8 times of the single mode fiber, when the optical signals output from the single mode optical fiber (the first optical fiber) are reflected on the beam outputting surface of the GRIN lens 20 and transmitted to the multi mode optical fiber (the second optical fiber), the optical signals can be detected with less optical loss.

By integrating optical elements such as an isolator core, filter or attenuator on the optical path between the two GRIN lenses, hybrid optical devices having special purposes can be manufactured.

According to the two optical fibers and the single GRIN lens as described above, a tap coupler enabling easy extraction of some of the optical signals propagating along the optical transmission lines can be fabricated with low production cost and smaller size.

While this invention has been described in connection with what is presently considered to be the most practical and preferred embodiment, it is to be understood that the invention is not limited to the disclosed embodiments, but on the contrary, is intended to cover various modifications and equivalent arrangements included within the spirit and scope of the appended claims.

What is claimed is:

1. A tap coupler comprising:

first and second optical fibers for transmitting optical signals; and a graded index (GRIN) lens for converting a part of the optical signals provided by one of the optical fibers into parallel beams and outputting the same, and for reflecting the remaining part of the optical signals and outputting the same to another optical fiber, said GRIN lens having an uncoated beam outputting surface opposite the first and second optical fibers that is free of a reflective coating such that the remaining part of the optical signals reflects from the beam outputting surface and is output to another optical fiber without undergoing reflection from a reflective element, and having an antireflection coating film on a surface of the GRIN lens facing the first and second optical fibers.

2. The tap coupler of claim 1, wherein the GRIN lens is arranged to be inclined to a predetermined angle with respect to an optical axis about which the first and second optical fibers are symmetrically positioned.

3. The tap coupler of claim 1 including only a single GRIN lens that is arranged in order for the center of the GRIN lens to be over an optical axis about which the first and second optical fibers are symmetrically positioned.

4. The tap coupler of claim 1 including only a single GRIN lens that is arranged in order for the center of the GRIN lens to be below an optical axis about which the first and second optical fibers are symmetrically positioned.

5. The tap coupler of claim 1, wherein the distance between output ends of the first and second optical fibers and the beam outputting surface of the GRIN lens is P/4, and P represents one pitch of the optical signal.

6. The tap coupler of claim 1, wherein the first optical fiber is a single mode optical fiber and the second optical fiber is a multi mode optical fiber.

* * * * *